April 7, 1931. E. E. BEHLER 1,799,946
POULTRY FEEDING OR WATERING TROUGH
Filed May 13, 1929
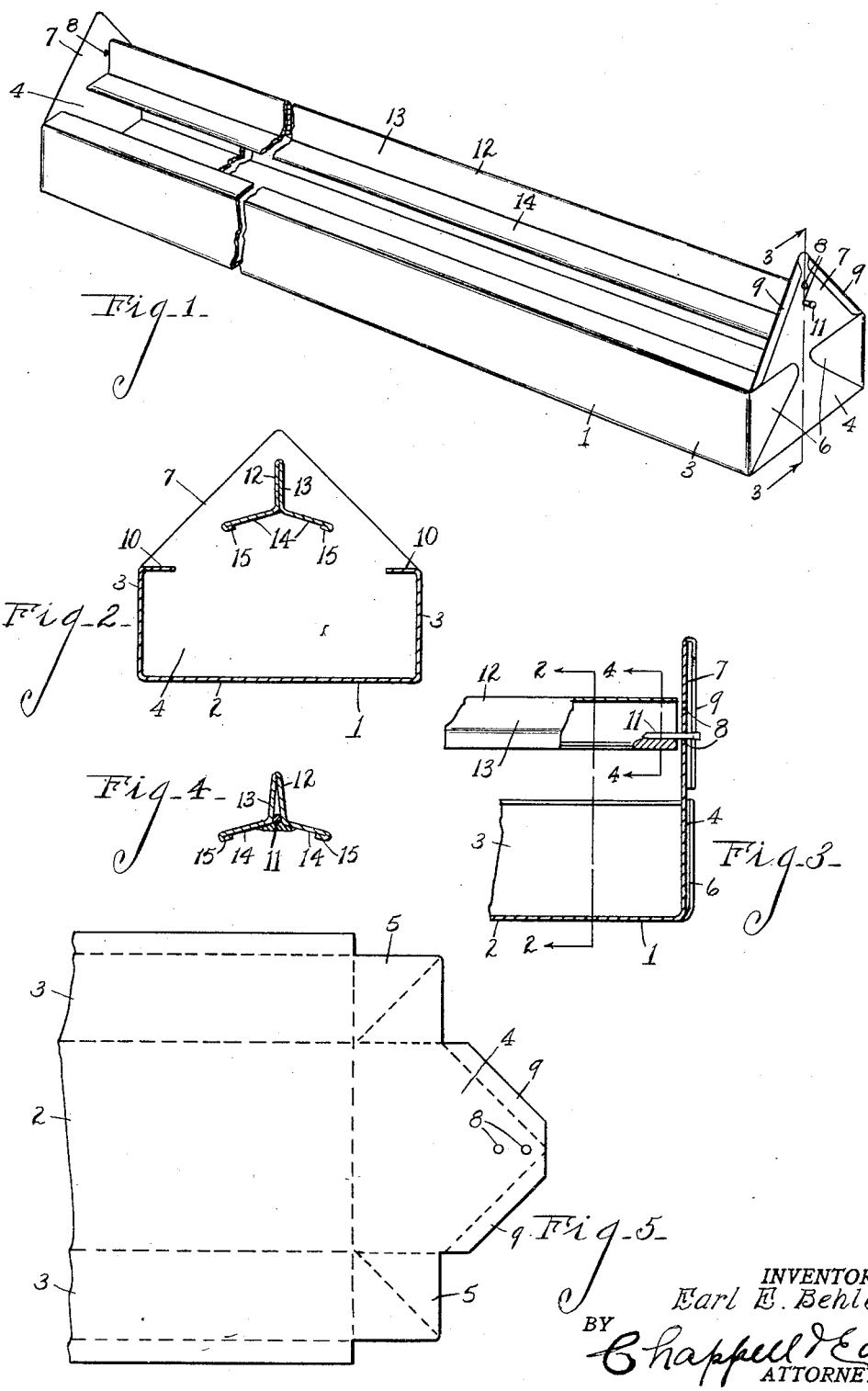
INVENTOR
Earl E. Behler
BY
Chappell & Earl
ATTORNEYS Patented Apr. 7, 1931

1,799,946

UNITED STATES PATENT OFFICE

EARL E. BEHLER, OF GRAND RAPIDS, MICHIGAN, ASSIGNOR TO W. C. HOPSON COMPANY, OF GRAND RAPIDS, MICHIGAN, A CORPORATION OF MICHIGAN

POULTRY FEEDING OR WATERING TROUGH

Application filed May 13, 1929. Serial No. 362,487.

The main objects of this invention are to provide a poultry feeding or watering trough which is of large capacity; that is, provides feeding or water space for a relatively large number of fowls, is effectively guarded to prevent the waste of feed and also to prevent soiling.

A further object is to provide a structure having these advantages which is very economical.

Objects relating to details and economies of my invention will appear from the description to follow. The invention is defined and pointed out in the claims.

A structure which is a preferred embodiment of my invention is illustrated in the accompanying drawing, in which:

Fig. 1 is a fragmentary perspective view of my improved feeding or watering trough.

Fig. 2 is a transverse section on line 2—2 of Fig. 3.

Fig. 3 is a fragmentary view partially in longitudinal section on line 3—3 of Fig. 1.

Fig. 4 is a transverse section through the guard rail on line 4—4 of Fig. 3.

Fig. 5 is a fragmentary plan view of the blank from which the trough is formed.

In the accompanying drawing, 1 represents the trough generally, this trough being formed of an integral blank comprising a bottom portion 2, side wall portion 3, and end wall portion 4.

The ends of the side and end walls are joined by the gusset portions 5 which are folded diagonally upon themselves, the folding lines being indicated by dotted lines in Fig. 5. These gusset portions are form flaps 6 which are folded upon the outer sides of the end walls constituting supports therefor. This also provides a sealed trough without the use of solder but is particularly desirable in this construction for reasons which will appear later.

The end walls are provided with A-shaped extensions 7 having spaced perforations 8. The edges of the end walls are folded outwardly upon themselves providing stiffening flanges 9.

The side walls have inturned flanges 10 at their upper edges, these flanges being folded within and constituting supports for the end walls.

The trough may thus be formed of comparatively light material and of considerable size; at the same time it is strong and rigid and the end wall extensions may be sprung outwardly to permit engagement and disengagement of the pivots 11 for the guard rail 12.

This guard rail 12 is formed of a strip of sheet metal folded upon itself to provide a central mid-rib 13 and opposed downwardly diverging arms 14. The edges of these arms are turned inwardly at 15 providing smooth edges and further stiffening the rail.

The pivots 11 are located at the bottom of the mid-rib and centrally of the guard rail so that it normally assumes a position with its mid-rib in upright position and the edges of its arms in spaced relation to the edges of the flanges 10 so that the trough is accessible from both sides but effective guards are provided so that the feed is not easily thrown from the trough for the fowls.

The guard rail is unstable in the event that fowls should attempt to roost thereon, thereby preventing soiling of the feed or water and also effectively guarding the same, as stated.

By providing for the vertical adjustment of the guard rail, the trough may be adapted to fowls of different sizes, and is well adapted for young chicks. The ends are so supported that the springing of their extensions does not open any joints.

Having thus described my invention, what I claim as new and desire to secure by Letters Patent, is:

1. A trough for feeding or watering poultry comprising integral side and end walls, the gusset between the ends of the side and end walls being folded diagonally upon itself providing flaps which are folded upon the outer sides of the end walls constituting supports therefor, the end walls being provided with A-shaped extensions having flanged edges, the side walls having inturned flanges of substantial width disposed with their ends in supporting engagement with the ends walls, said extensions having vertically spaced holes therein, a guard rail, and pivots at the ends of said guard rail selectively engageable with said holes in said end extensions and whereby said guard rail is rotatably supported.

2. A trough for feeding or watering poultry comprising side and end walls, the end walls being provided with extensions, the side walls having inturned flanges of substantial width, said extensions having vertically spaced holes therein, a guard rail formed of a piece of sheet metal folded upon itself to provide a central mid-rib and downwardly inclined arms, and pivots projecting at the bottom of its mid-rib selectively engageable with said holes in said end extensions and whereby said guard rail is rotatably supported but normally assumes a position with its mid-rib in upright position and the edges of its arms in spaced relation to the edges of the side wall flanges and constituting a guard for the trough.

3. A trough for feeding or watering poultry comprising integral side and end walls, the gusset between the ends of the side and end walls being folded diagonally upon itself providing flaps which are folded upon the outer sides of the end walls constituting supports therefor, the end walls being provided with A-shaped extensions having flanged edges, the side walls having inturned flanges of substantial width disposed with their ends in supporting engagement with the end walls, said extensions having vertically spaced holes therein, a guard rail, and pivots on said guard rail selectively engageable with said holes in said end extensions and whereby said guard rail is rotatably supported.

4. A trough for feeding or watering poultry comprising side walls having inturned flanges at their upper edges and end walls having extensions on their upper edges, a guard rail formed of a piece of sheet metal folded upon itself to form a central mid-rib and downwardly inclined arms, the edges of the arms being folded inwardly, and centrally disposed pivots adjustably engageable with said end extensions whereby said guard is rotatably supported but normally assumes a position with its mid-rib in upright position and the edges of its arms is spaced relation to the edges of said side wall flanges and constituting a guard for the trough.

5. A trough for feeding or watering poultry comprising side walls having inturned flanges at their upper edges and end walls having extensions on their upper edges, a guard rail formed of a piece of sheet metal folded upon itself to form a central mid-rib and oppositely projecting arms, and centrally disposed pivots adjustably engageable with said end extensions whereby said guard is rotatably supported but normally assumes a position with its mid-rib in upright position.

6. The combination with a trough having inwardly projecting side flanges and a guard rail formed of a piece of sheet metal folded upon itself to form a central mid-rib and downwardly inclined arms, the edges of the arms being folded inwardly, said guard rail having centrally disposed pivots whereby it is rotatably supported but normally assumes a position with its mid-rib in upright position and the edges of its arms in spaced relation to the edges of said side wall flanges and constituting a guard for the trough.

7. The combination with a trough, of a guard rail formed of a piece of sheet metal folded upon itself to form a central mid-rib and oppositely projecting arms, the edges of the arms being folded inwardly, said guard rail having centrally disposed pivots whereby it is rotatably supported but normally assumes a position with its mid-rib in upright position.

8. A trough for feeding and watering poultry comprising integral side and end walls, the gusset between the side and end walls being folded diagonally upon itself providing flaps which are folded upon the outer sides of the end walls constituting supports therefor, the end walls being provided with A-shaped extensions and having holes therein, and a guard rail provided with pivots at its ends engageable with said holes in said extensions, whereby the guard rail is rotatably supported, said extensions being capable of being sprung to facilitate the engagement and disengagement of the pins.

In witness whereof I have hereunto set my hand.

EARL E. BEHLER.